July 10, 1951  J. B. ARMITAGE  2,560,149
POSITIONING MECHANISM FOR MACHINE TOOLS
Filed March 17, 1947  6 Sheets-Sheet 2
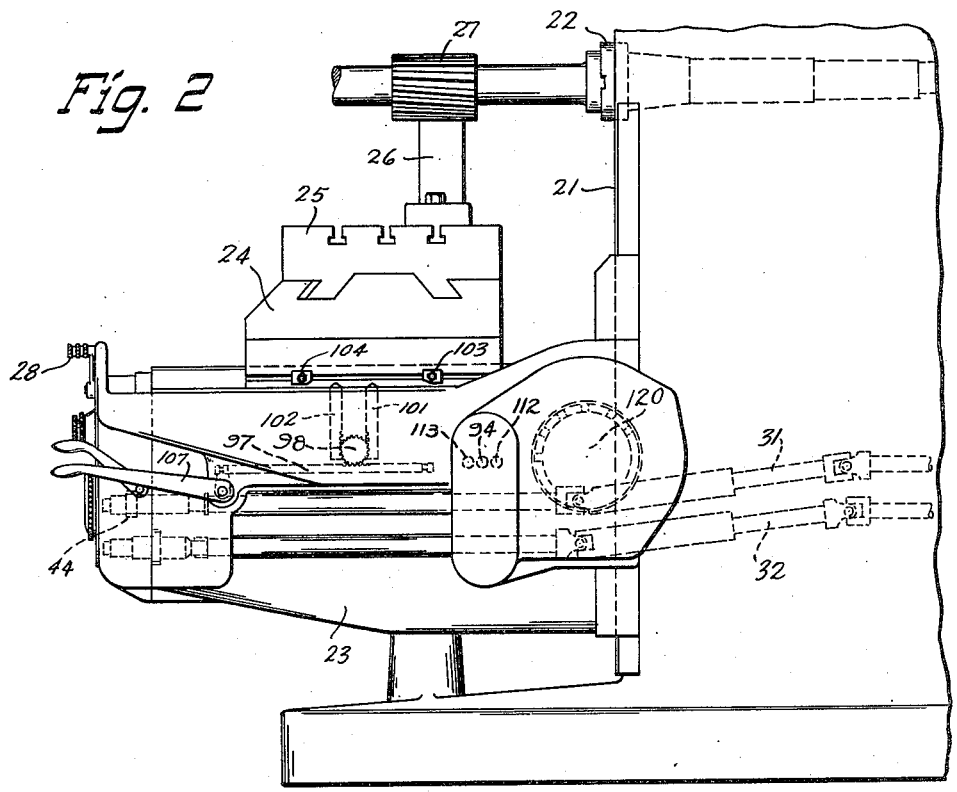
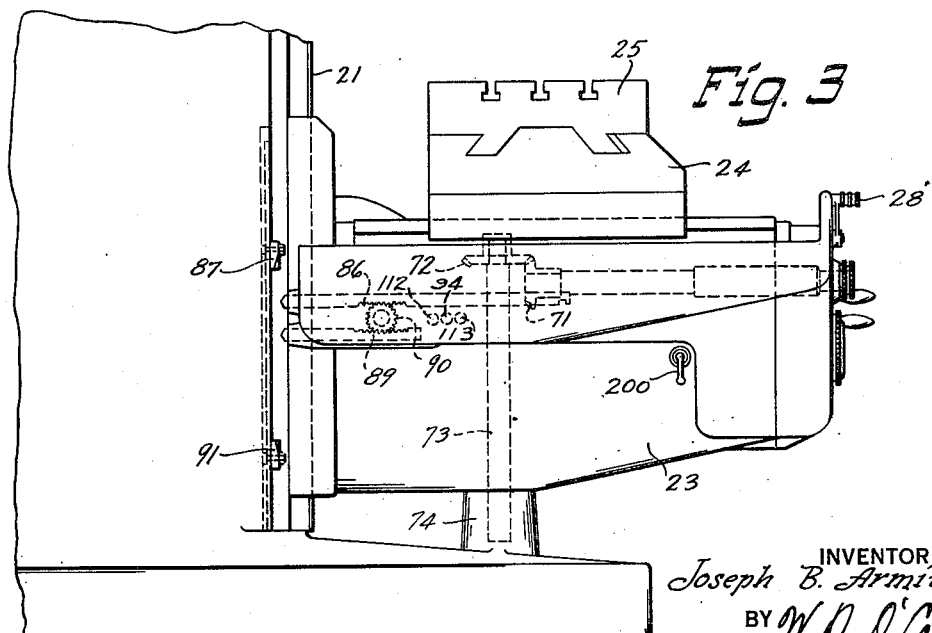
INVENTOR
Joseph B. Armitage
BY W. D. O'Connor
ATTORNEY

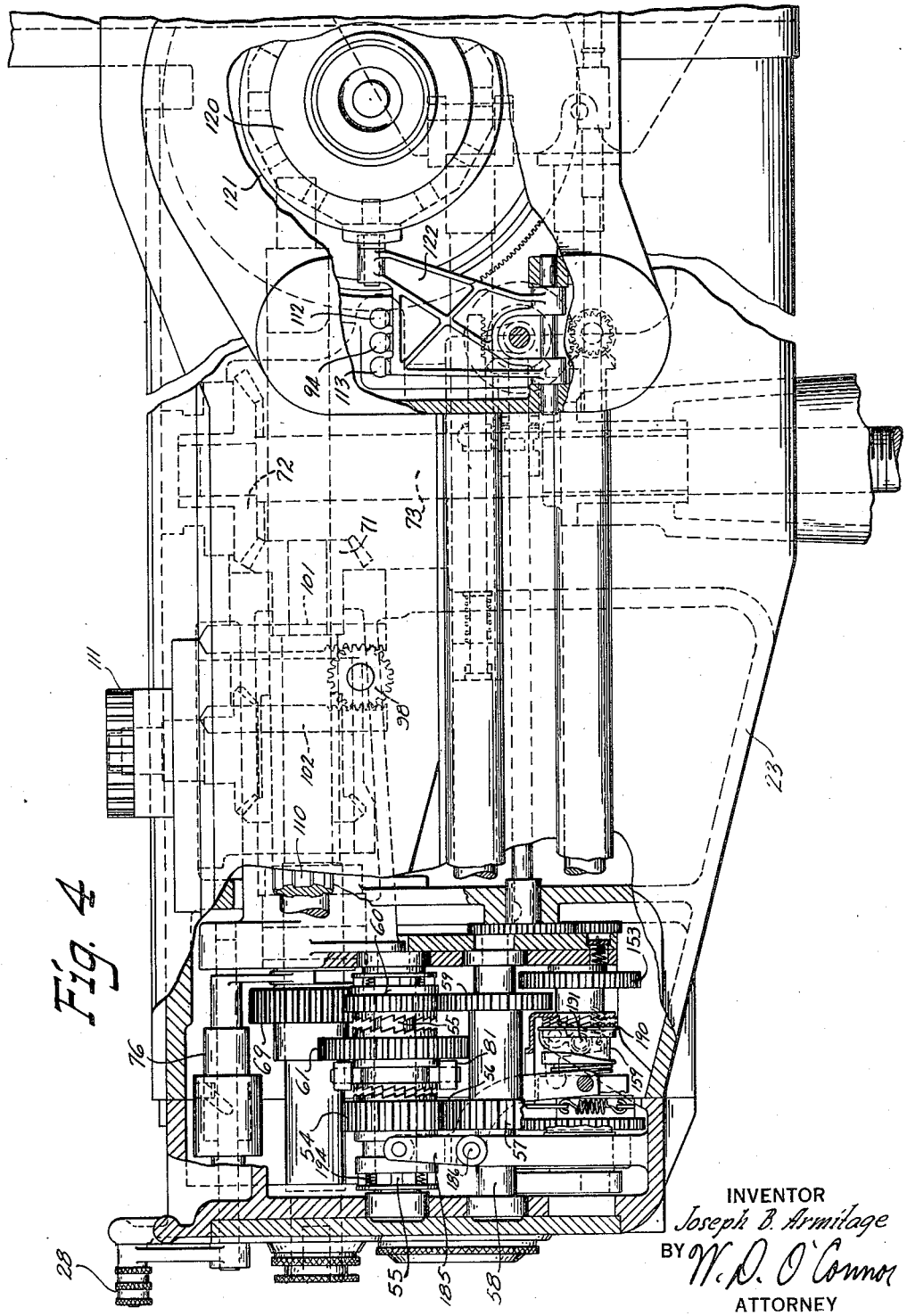

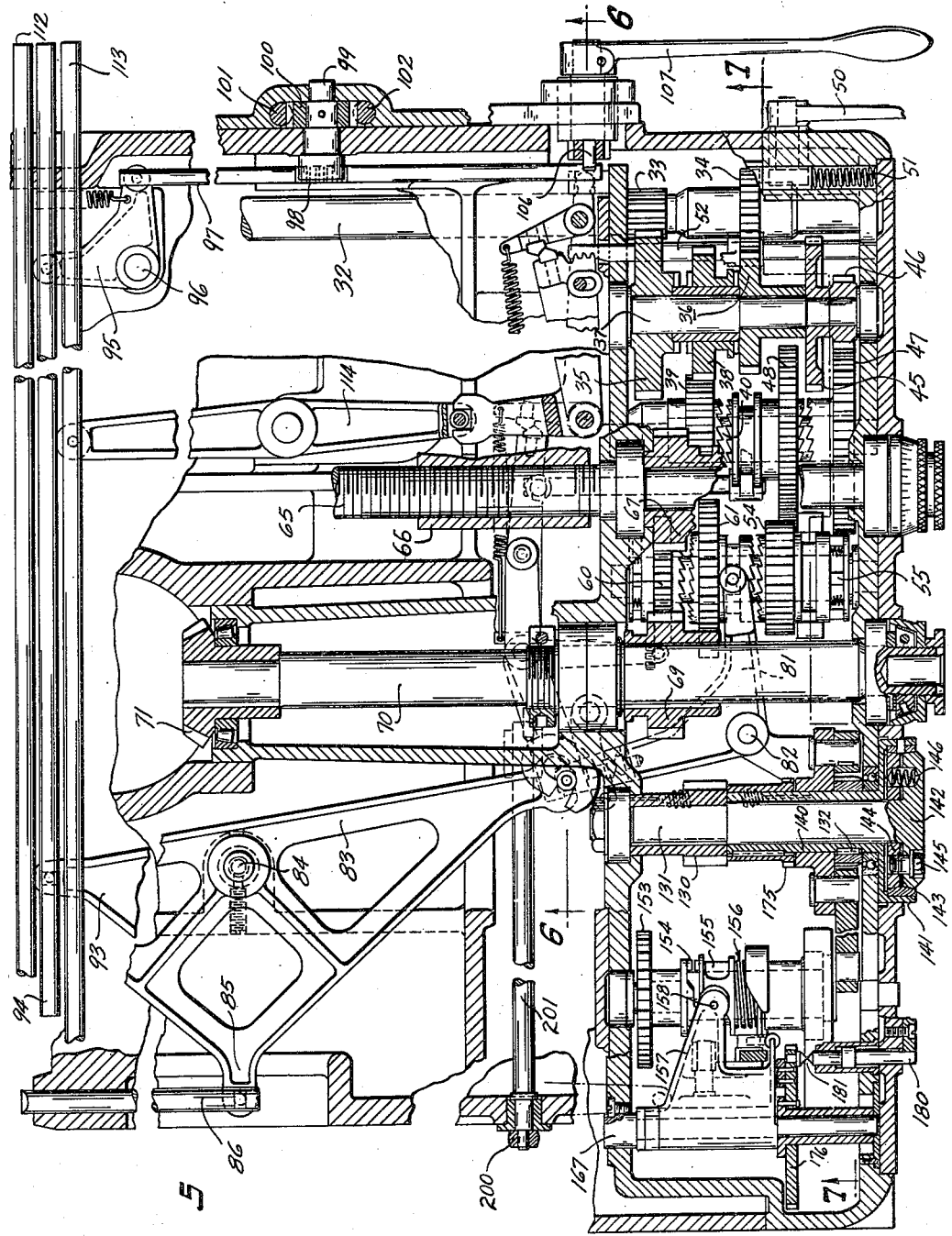

INVENTOR
Joseph B. Armitage
BY W. D. O'Connor
ATTORNEY

July 10, 1951   J. B. ARMITAGE   2,560,149
POSITIONING MECHANISM FOR MACHINE TOOLS
Filed March 17, 1947   6 Sheets-Sheet 6
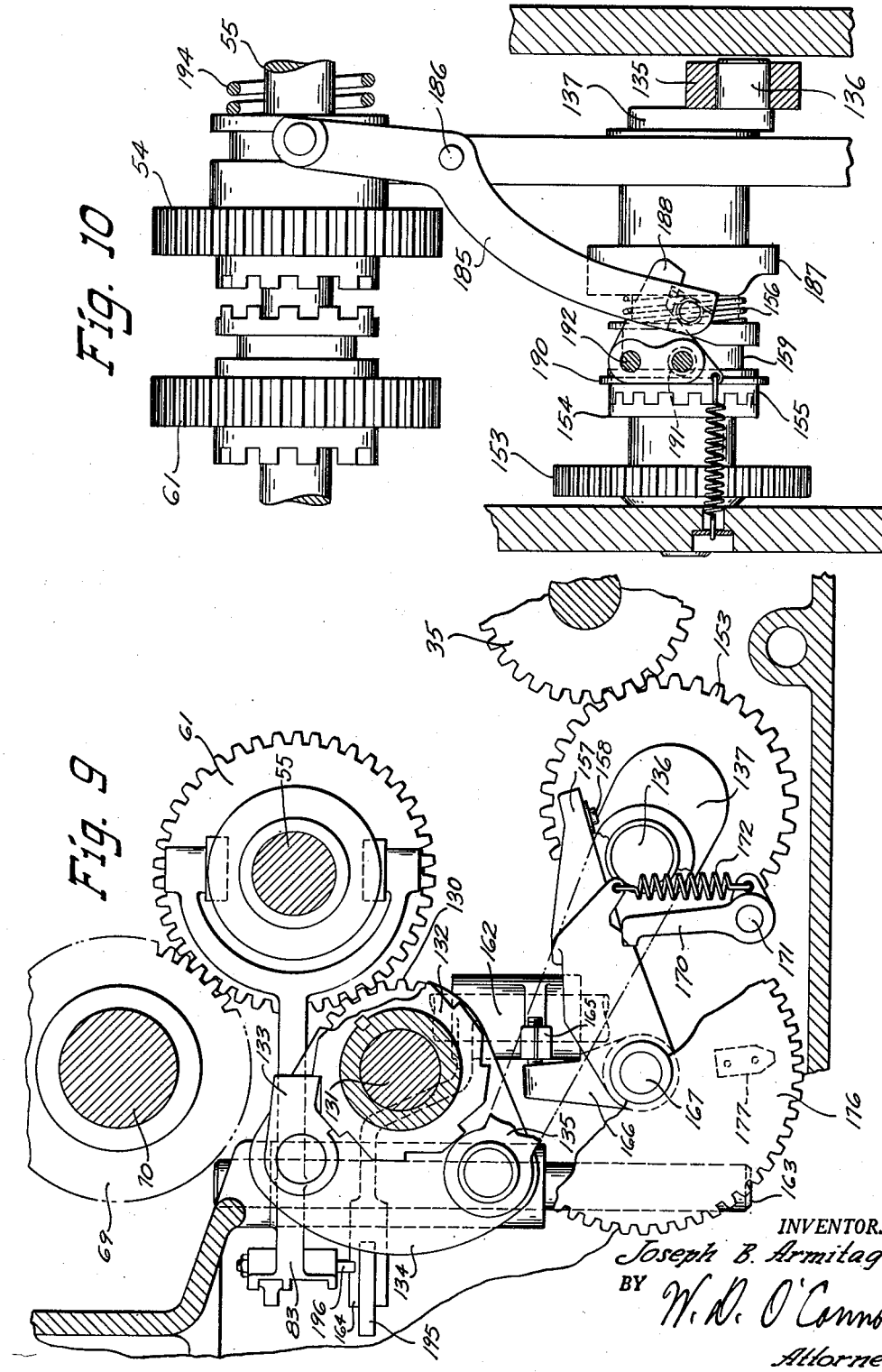
INVENTOR.
Joseph B. Armitage
BY W. D. O'Connor
Attorney Patented July 10, 1951

2,560,149

UNITED STATES PATENT OFFICE 2,560,149

POSITIONING MECHANISM FOR MACHINE TOOLS

Joseph B. Armitage, Wauwatosa, Wis., assignor to Kearney & Trecker Corporation, West Allis, Wis., a corporation of Wisconsin Application March 17, 1947, Serial No. 735,108

15 Claims. (Cl. 90—21)

This invention relates, generally, to machine tool transmission mechanisms and more particularly to an improved arrangement for precisely positioning a movable element of a machine tool.

Movements of power driven elements of machine tools are ordinarily controlled by automatically operating trip mechanism arranged to cause the machine element to stop approximately at a predetermined position in the course of its movement. Because of changing conditions of load and resistance to movement, the usual automatic trip mechanism cannot be relied upon to cause the machine element to stop at a predetermined position with the degree of accuracy required in precision machining operations.

In overcoming this difficulty, the automatic trip mechanism is usually adjusted to stop the movable machine element somewhat short of its accurately predetermined terminal position, whereupon manually operated adjusting means are brought into use to complete the movement under the guidance of precision measuring instruments, to insure proper positioning.

A general object of the present invention is to provide for automatically positioning a movable element of a machine tool with a high degree of precision.

Another object of the invention is to provide power driving mechanism arranged to move a machine element to and stop it precisely at a predetermined position.

Another object is to provide accurate positioning mechanism whereby a machine element may be moved precisely to a predetermined position with smoothly decelerating action.

Another object is to provide a machine tool positioning mechanism wherein a machine element is moved to final position by mechanism operating with simple harmonic motion.

Another object is to provide improved power feeding mechanism for a machine tool element in which a main feeding drive is disconnected by trip mechanism as the element approaches its final position and an auxiliary drive is engaged to complete the positioning movement.

Another object is to provide improved positioning mechanism in which the final positioning movement is effected by a crank mechanism in passing through dead center position while acting upon an abutment in manner to move it with simple harmonic motion.

Another object is to provide an improved positioning mechanism in which a pawl operates upon a ratchet to cause the element to approach a predetermined position and a trip mechanism automatically stops operation of the pawl after it has completed a final ratcheting movement to position the movable element.

A further object is to provide a precise positioning mechanism in which a connecting link driven by a crank acts upon an abutment in manner to move it with simple harmonic motion for effecting a smoothly decelerating positioning movement as the crank passes through dead center position.

According to this invention, the power feeding mechanism of a machine tool is provided with supplemental apparatus arranged to advance a supporting element of the machine to and stop it automatically precisely at a predetermined position with a high degree of accuracy. This is accomplished through the operation of tripping mechanism which disconnects the main drive as the element approaches a predetermined position and engages supplemental drive apparatus to complete the precise positioning movement. The final movement of the element is effected with a smoothly decelerating action by linkage operating with simple harmonic motion. For example, the final movement of a milling machine table may be effected by a crank mechanism operating through linkage upon an abutment which moves with smoothly decelerating simple harmonic motion precisely to the predetermined position as the crank mechanism passes through dead center. The abutment may be a tooth of a ratchet wheel which is engaged by a pawl operated by a crank and connecting rod mechanism, the ratchet wheel being adjustably connected with the table drive mechanism in order that the table may be caused to stop at a precisely predetermined position as the crank passes dead center. In a milling machine, the normal tripping mechanism may be set to disconnect the usual feed drive as the table approaches the predetermined position and automatically to engage the supplemental drive for the final positioning movement. Trip mechanism or timing gears associated with the ratchet may be arranged to permit as many ratcheting movements as may be required prior to the final positioning movement and serves to disengage the supplemental drive after the crank mechanism passes through the final dead center position.

The foregoing and other objects of this invention, which will become more fully apparent from the following detailed specification, may be achieved by means of the particular mechanism constituting an exemplifying embodiment of the invention depicted in and described in connection with the following drawings, in which:

Fig. 2 is a view in right side elevation of the machine shown in Fig. 1, part of the column having been broken away;

Fig. 3 is a view similar to Fig. 2 but in left side elevation;

Fig. 4 is an enlarged view in vertical section taken longitudinally of the knee of the machine, generally along the line 4—4 in Fig. 1;

Fig. 5 is a developed section taken horizontally through the knee, generally along the line 5—5 of Fig. 1;

Fig. 9 is an enlarged view in vertical transverse section through the knee, generally similar to part of Fig. 7, but showing the transmission mechanism in another position; and Fig. 10 is a detailed view of part of the transmission mechanism, taken substantially along the line 10—10 in Fig. 7.

Figure 1:
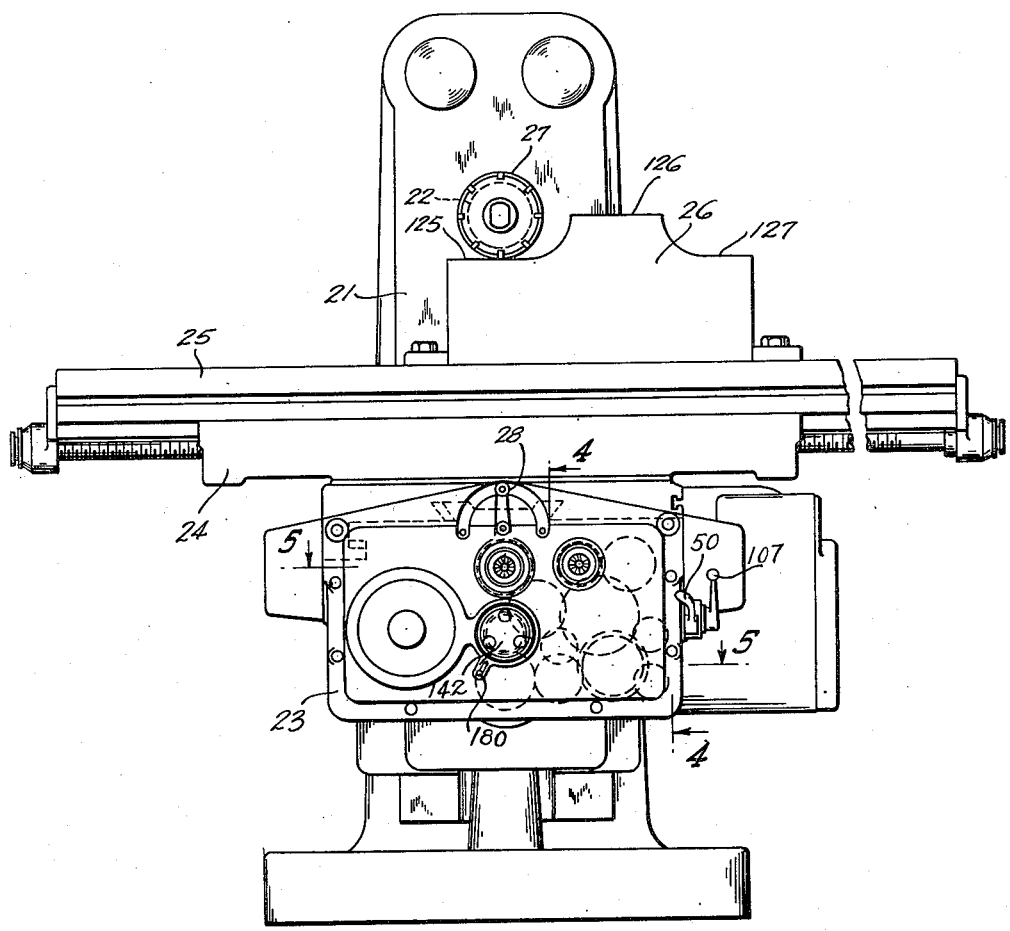
Figure 1 is a view in front elevation of a milling machine incorporating apparatus embodying the invention.

The particular machine tool shown in the drawings as exemplifying apparatus in which the positioning mechanism of the present invention may be incorporated with advantageous results, is a milling machine of the well known knee and column type, although it is to be understood that the present invention may, with equal advantage, be embodied in various machine tools or other machines of quite different construction.

Referring more specifically to the drawings and particularly to the general views shown in Figs. 1, 2 and 3, the milling machine there illustrated comprises essentially a combined base and upstanding column structure 21 which constitutes the frame of the machine and carries a horizontally disposed cutter driving spindle 22. On the front of the column 21 there is slidably mounted for vertical adjustment the usual work supporting knee 23. A saddle structure 24 is slidably mounted on the upper surface of the knee 23 for horizontal movement toward or from the column in a well known manner. The saddle, in turn, carries a work supporting table 25 slidably mounted for longitudinal movement transversely of the spindle 22 in a position to support a workpiece 26 in cooperative relationship with a cutter 27 mounted in the spindle.

In the particular machine shown in the drawings, the saddle 24 and knee 23 are arranged for movement alternatively by power feeding mechanism. To this end, power may be applied selectively to move either the knee or the saddle by shifting a lever 28 on the front of the knee from the neutral position shown, either to the right for moving the knee or to the left for moving the saddle, the table 25 being driven by an independent drive train and independently controlled.

This particular milling machine is further provided with fully automatic control mechanism arranged to cause the work supporting table 25 to effect a series of predetermined movements for moving the workpiece 26 relative to the cutter 27 in a manner to effect successive cutting operations independently of the attention of the machine operator. This mode of automatic operation is made possible by the positioning mechanism which constitutes the subject matter of this invention. The positioning mechanism is associated with the knee and saddle drive mechanism and operates automatically as required to move the workpiece 26 either inwardly or upwardly into precise relationship with the cutter 27 in a manner to insure the machining of successive cuts on the workpiece in a precisely predetermined relationship.

Power for driving the machine may be furnished by an electric motor (not shown) preferably mounted in the base of the column 21 and operatively connected in a well known manner to drive the cutter spindle 22 at any selected speed. Power for effecting the feeding movements is likewise derived from the same motor and is transmitted through rate changing mechanism (not shown) on the column, and thence to the knee 23 by means of a jointed transmission shaft 31 one part of which is rotatably mounted in the knee 23. A second similar jointed transmission shaft 32, beneath the shaft 31 and likewise having a portion rotatably mounted in the knee, transmits power from the column at a constant rate for effecting movement of the work supporting elements at rapid traverse rate.

As best shown in Figure 5, the rapid traverse drive shaft 32 is provided at its forward end within the knee with gears 33 and 34 of different diameters that mesh respectively with complementary gears 35 and 36 rotatably mounted on a parallelly disposed shaft 37. A clutch gear 38 is slidably mounted between and arranged to be clutched selectively with the one or the other of the gears 35 and 36 in a manner to transmit power for rapid traverse drive at either of two rates selectively to a rapid traverse gear 39 meshing with the clutch gear 38 and rotatably mounted on another parallel shaft 40.

As shown in Fig. 2, the feed drive shaft 31 is provided at its forward end within the knee 23 with a driving pinion 44 that meshes with a gear 45 rotatably mounted on the shaft 37, as shown in Fig. 5. The gear 45 has integrally formed with it a pinion 46 that meshes with a feed rate clutch gear 47 rotatably mounted on the shaft 40 in spaced relationship with the rapid traverse gear 39. Slidably mounted on the shaft 40 between the rapid traverse gear 39 and the feed gear 47 is a clutch gear 48 which may be selectively moved into clutching engagement with either the feed rate gear or the rapid traverse rate gear selectively. A hand lever 50 on the right side of the knee 23 is operatively connected to shift both the clutch gear 48 and the clutch gear 38 and is biased by a spring 51 to a central, neutral position in which the clutch gear 48 is engaged with the feed rate gear 47. Movement of the lever 50 in either direction operates shifting linkage 52 to effect engagement of the clutch gear 48 with the rapid traverse gear 39. Furthermore, movement of the lever 50 in the one or the other direction effects alternative shifting of the clutch gear 38 into engagement with either the high speed rapid traverse gear 36 or the low speed rapid traverse gear 35 selectively. By this arrangement, rapid traverse drive may be effected at the high rate or the low rate depending upon the direction in which the lever 50 is moved from the central feed rate position.

The rate selecting gear 48 meshes with a clutch gear 54, rotatably mounted on a parallel shaft 55 and which meshes, as shown in Fig. 4, with a table driving gear 56 which, in turn, meshes with a gear 57 on another parallel shaft 58. The gear 57 on the shaft 58 is connected with a gear 59 that meshes with another clutch gear 60 on the shaft 55, the arrangement being such that the clutch gears 54 and 60 rotate in opposite directions at the rate selected by positioning the clutch gear 48. Between the opositely rotating gears 54 and 60, there is slidably mounted a reversing clutch gear 61 which may be shifted from the neutral position shown into clutching engagement with either the gear 54 or the gear 60 for rotation in a selected direction.

Figure 6:
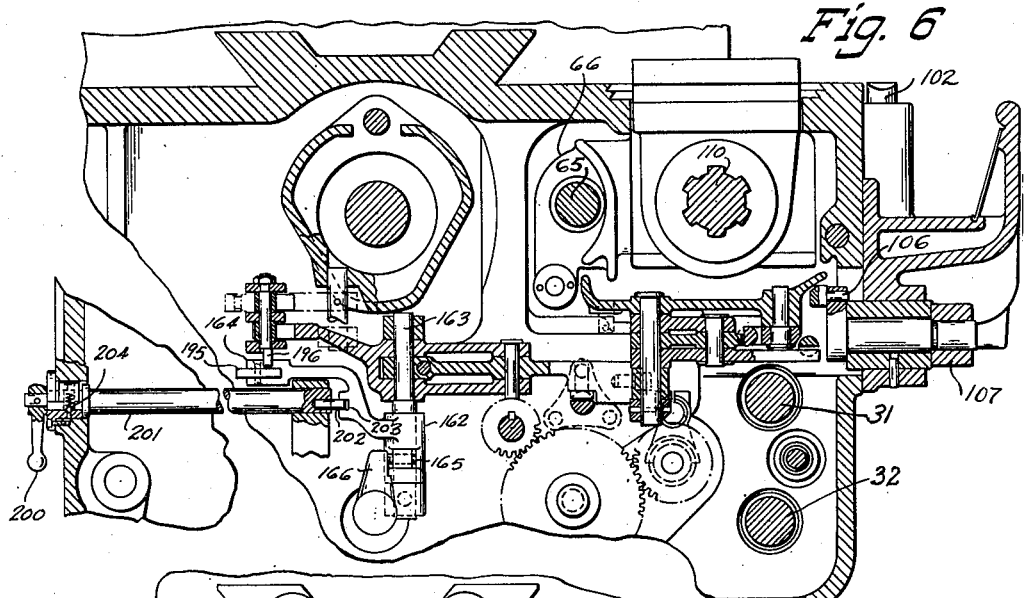
Fig. 6 is a view in vertical section taken transversely of the knee, generally along the line 6—6 in Fig. 5.
Figure 7:
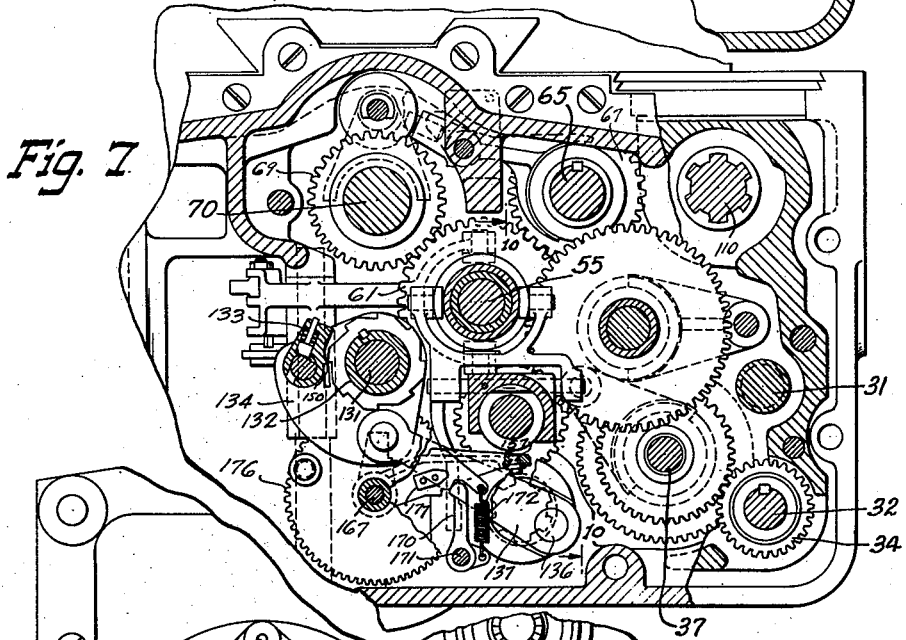
Fig. 7 is another view in vertical section taken transversely of the knee, generally along the line 7—7 in Fig. 5.

For moving the saddle 24 along the knee 23, there is provided a screw shaft 65 which is rotatably mounted in the knee and has threaded engagement with a nut 66 secured to a depending portion of the saddle, as shown in Fig. 6. Slidably mounted on the screw shaft 65 is a driving gear 67 that may be moved selectively into meshing engagement with the reversing clutch gear 61 as indicated in Fig. 7, whereby the saddle may be driven selectively in either direction. A similar sliding gear 69 is mounted on a shaft 70 rotatably mounted in the knee parallel with the screw shaft 65. The shaft 70 is provided at its inner end with a bevel pinion 71 which meshes with a complementary bevel pinion 72 on a vertical screw shaft 73 having threaded engagement with a nut 74, fixed on the base 21, as shown in Fig. 3, and operates to effect vertical movement of the knee 23.

As indicated in Fig. 4, the selecting lever 28 on the front of the knee is connected by a cam and linkage mechanism 76 in manner to move either the knee actuating gear 69 or the saddle actuating gear 67 into mesh with the reversing clutch gear 61, alternatively, the arrangement being such that both of these gears cannot be moved into mesh with the reversing gear at the same time.

The reversing clutch gear 61 is engaged by one end of a bell crank shifting fork 81 mounted on a vertically disposed pivot 82 and engaged at its other end by one arm of a tripping member 83, as shown in Fig. 5. The tripping member 83 is pivotally mounted on a vertical pin 84 and is provided with a laterally projecting arm 85 which engages a horizontal slidably mounted trip plunger 86. As shown in Fig. 3, the trip plunger 86 extends rearwardly from the knee 23 in position to engage a trip dog 87 adjustably mounted on the column 21, in the course of upward movement of the knee. When the trip plunger 86 engages the dog 87, it is moved inwardly and operates through the member 83 and the bell crank 81 to move the reversing clutch gear 61 out of engagement with the driving clutch gear to its disengaged, neutral position. A second trip plunger 89 is operatively connected with the trip plunger 86 by an interposed pinion 90 and is disposed to engage a lower trip dog 91 on the column in the course of downward movement of the knee, whereupon the reverse clutch gear 61 is moved to neutral position from engagement with the oppositely rotating driving clutch gear.

A third, rearwardly projecting arm 93 of the tripping member 83, engages a transverse control rod 94 extending along the back of the knee. At the right side of the knee, the control rod 94 engages one arm of a bell crank 95, mounted on a vertically disposed pivot pin 96, the other arm of the bell crank being engaged by a control rod 97 disposed longitudinally in the side of the knee. The rod 97 is provided with rack teeth which mesh with a pinion 98 on a stub shaft 99 extending transversely through the side of the knee. At its outer end, the stub shaft 99 is provided with a pinion 100 which is disposed between and meshes with rack teeth on vertically disposed trip plungers 101 and 102. As shown in Fig. 2, the trip plungers 101 and 102 are positioned to be engaged by trip dogs 103 and 104, respectively, adjustably mounted on the side of the saddle 24, the arrangement being such that when either plunger is depressed by a contacting dog, the connecting control linkage operates to move the reversing clutch gear 61 to neutral position. The control rod 97 is also engaged by an eccentric pin 106 on the shaft of a reversing lever 107 mounted on the right side of the knee for manual actuation of the reversing clutch gear 61.

By this arrangement of controls, power may be applied to move either the knee or the saddle in either direction by first positioning the selecting lever 28 to engage the one or the other support driving train and then shifting the reverse lever 107 in the one or the other direction to select the direction of movement of the chosen element, the movement continuing until one of the trip plungers is engaged by a cooperating dog to move the reversing gear 61 to neutral position.

Power for effecting feeding movements of the table 25 along the saddle 24 is transmitted at the selected feed or rapid traverse rate from the selector clutch gear 48 and the table driving gear 56 through a splined shaft 110 and transmission gearing 111, shown in Figs. 4 and 7, to reversing and disconnecting gearing in the saddle 24 which may be engaged selectively to move the table in either direction. The usual tripping mechanism (not shown) is arranged to control movements of the table and in this instance includes a control rod 112 disposed transversely of the knee 23 parallel with the control rod 94 for the knee and saddle. A third transverse control rod 113 is operatively connected by control linkage 114 with the feed and rapid traverse selecting linkage 52 which shifts the rate selecting clutch gear 48.

The three transverse control rods 94, 112 and 113 are arranged to cooperate with a control drum 120, rotatably mounted on the right side of the knee, and carrying trip dogs 121 that act upon trip levers 122 which operate the various control rods. The control drum and trip lever mechanism is of the type more fully shown and described in Patent No. 1,715,604, issued June 4, 1929, to Edward J. Kearney and Joseph B. Armitage. By this arrangement, the work supporting table 25 may be moved automatically in manner to effect a predetermined series of machining operations on the workpiece 26. For example, as shown in Fig. 1, it may be desired to machine a horizontal surface 125 on the workpiece, then lower the knee to pass over a raised portion 126 and, thereafter, raise the knee to machine a second horizontal surface 127 at the other side of the raised portion. The necessary movements of the knee 23 and table 25 may be initiated by operation of the control drum 120, the movements being terminated at predetermined positions by operation of the dog actuated trip mechanism.

However, the usual trip mechanism cannot be depended upon to stop the movement of the table at a precisely predetermined position, in view of the fact that the table tends to continue in movement after the trip mechanism functions and the extent of the continuing movement is unpredictable and inconstant, inasmuch as it depends upon the weight of the workpiece, the speed of travel, the frictional resistance and other changeable factors. Accordingly, in order that the two surfaces 125 and 127, for example, may be machined in precise alignment under automatic operation, it is necessary that auxiliary equipment be provided for precisely positioning the knee 23 along the column 21 in preparation for effecting the second machining operation.

In accordance with this invention, final accurate positioning of the workpiece 26 either through movement of the knee or movement of the saddle toward the cutter 27 is effected by means of an auxiliary actuating mechanism which operates to turn the reversing clutch gear 61 slowly, after it has been disengaged from the driving clutch gears, for advancing the table in manner to precisely position the workpiece. The auxiliary drive mechanism operates by moving an abutment, for example the tooth of a ratchet wheel, with simple harmonic motion, preferably by means of a crank mechanism, to advance the workpiece with smoothly decelerating action precisely to the predetermined position for effecting the succeeding machining operation.

In the particular positioning mechanism shown in the drawing, the reversing clutch gear 61 is constantly in mesh with a gear 130 on a parallel shaft 131 that has adjustably connected with it a toothed ratchet wheel 132, as shown in Figs. 5, 7 and 9. The ratchet wheel 132 is arranged to be engaged by a ratchet pawl 133 which is pivotally carried by a rocking plate 134 pivotally supported on the shaft 131. As shown in Figs. 7 and 9, the plate 134 has pivotally connected to it one end of an actuating connecting rod 135, the other end of which is journalled on a crank 136 carried by a crank shaft 137.

In moving the knee upward or the saddle inward to position the workpiece 26, the crank 136 is turned to cause the connecting rod 135 to move the rocking plate 134 with simple harmonic motion. Consequently, as the crank 136 approaches the dead center position shown in Fig. 9, the pawl 133 on the rocking plate 134 causes the ratchet wheel 132 to advance with smoothly decelerating action in such manner that as the crank 136 passes through the dead center position, the ratchet wheel and connected drive mechanism ceases movement with the workpiece 26 located precisely at the predetermined position, the pawl 133 being retracted from the ratchet tooth as the crank 136 continues its movement.

Figure 8:
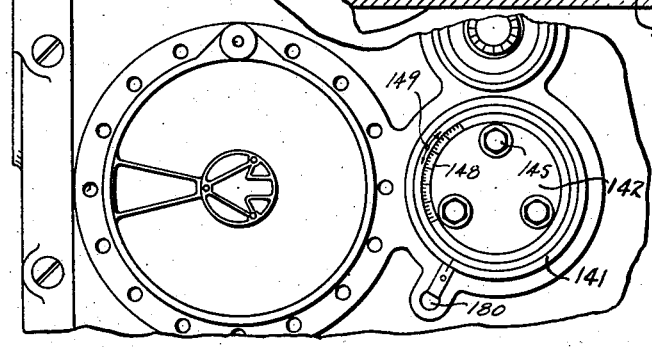
Fig. 8 is an enlarged fragmentary view in front elevation of control mechanism on the front of the knee, as shown in Fig. 1.

As best shown in Fig. 5, the ratchet wheel 132 is carried by and fixed in a sleeve 140 rotatably mounted on the shaft 131. The sleeve 140 projects at the front of the knee 23 and carries on its projecting end an enlarged disk or drum 141 which surrounds an enlarged end or head 142 of the shaft 131. A friction ring 143, fixed within the drum 141, presents oppositely tapered inner surfaces arranged as shown to be clutched by clamping action between complementary surfaces on the head 142 and on a friction disk 144 movably mounted within the drum, upon tightening screws 145. Compression springs 146 are provided between the head and the disk to separate them when the screws are loosened. As best shown in Fig. 8, the head 142 is provided on its outer face with dial indicia 148 that cooperate with an indicator 149 on the drum 141.

By this arrangement, the ratchet wheel 132 may be adjusted in phase relationship with the shaft 131 and the work moving transmission mechanism, in manner to provide exact positioning of the work as the crank 136 passes through the dead center position. Should the final positioning movement after initial adjustment result in moving the workpiece too far or not far enough, the necessary correction may be effected by loosening the screws 145 and turning the sleeve 140 and ratchet wheel 132 relative to the shaft 131 in the direction and to the extent required, as indicated by the dial 148. Subsequent positioning movements should then result in the workpiece being moved precisely to the predetermined position.

At the termination of a positioning movement, the rocking plate 134 is retracted to the position shown in Fig. 7 in approaching which the pawl 133 engages a fixed abutment 150 which cooperates with a notch 151 in the inner side of the pawl and swings it counterclockwise out of contact with the ratchet wheel 132, in order that the wheel may turn freely without touching the pawl. As previously explained, since the gear 130, on the ratchet shaft 131, meshes directly with the reversing clutch gear 61, the ratchet shaft and mechanism connected with it rotates continuously, whenever the feeding mechanism is engaged for movement of the knee or saddle in either direction.

The pawl actuating crank shaft 137 has rotatably mounted thereon a gear wheel 153 which is constantly driven through meshing engagement with rapid traverse drive gear 35. The gear 153 is provided with clutch teeth 154 adapted to be engaged by complementary teeth of a clutch collar 155, that is slidably splined on the crank shaft 137, the arrangement being such that when the clutch is engaged, the crank shaft 137 rotates continuously with the gear 153. The clutch collar 155 is urged to its engaged position by a coil spring 156 and may be withdrawn from engagement by operation of a trip arm 157 carrying a follower 158, which, when engaged with a cam groove 159 in the clutch 155, forces it out of engagement at a predetermined point in the cycle of rotation of the shaft, preferably the point at which the crank 136 has retracted the pawl 133 from contact with the ratchet wheel 132. Ordinarily, the latch 157 retains the clutch 155 in disengaged position, with the crank shaft 137 stationary and the pawl retracted during movement of the knee or saddle under power feed.

The trip mechanism of the machine is so arranged that when the power feed for either upward movement of the knee or inward movement of the saddle is tripped out, the trip arm 157 is raised to permit engagement of the positioning mechanism driving clutch 155. This is accomplished by a trigger mechanism best shown in Fig. 9, including a bell crank 162, pivotally mounted on a vertical pin 163 in the knee and having the end of one arm 164 disposed in position to be engaged by the end of the tripping member 83. When the tripping member 83 is moved by either an "up" or an "in" trip dog at the termination of the feeding movement, the bell crank 162 is turned on the pivot 163 in such manner that another arm 165 thereof engages an upstanding element 166 of the trip arm 157, in manner to pivot the trip arm about its horizontal supporting pin 167, in direction to withdraw the follower 158 from the cam groove 159, thereby permitting the spring 156 to move the clutch 155 into engagement with the clutch teeth 154 of the rotating gear 153. When the trip arm 157 moves upward, a latch 170, pivoted on a horizontal pin 171, is urged by a spring 172 into latching engagement with the trip arm 157 to retain it in its upper disengaged position, the spring 172 being connected at its other end with the arm 157 in manner tending to urge it into engaged position.

Since a single movement of the ratchet wheel 132 by the pawl 133 effects only a very slight movement of the knee or saddle, it is ordinarily necessary, in order to insure against overrunning the final position, to provide for tripping out the power feeding movement at such distance in advance of the final position as may require several ratcheting movements for the final positioning operation. Accordingly, the positioning mechanism is arranged to provide for as many ratcheting movements as may be necessary to advance the knee or saddle from the random position at which it happens to stop after the feed is tripped out, to the position at which the final ratcheting movement locates the workpiece precisely at the predetermined position.

For this purpose, the ratchet wheel 132 has connected with it a timing gear 175, that meshes with a larger timing gear 176, rotatably mounted on the pin 167 which supports the trip arm 157. Since the ratchet shaft 131 is positively geared to the reversing clutch 61, it and the timing gears operate in synchronism with movement of the knee or saddle, since the reversing clutch gear 61 remains in mesh with the driven gears 67 or 69, as the case may be. Consequently, a tripping cam lobe 177 on the gear 176 moves in timed relationship with the driven knee or saddle and stops when the feed is tripped out at a position depending upon the random error distance between the point at which the feed is discontinued and the precisely predetermined point to which the workpiece is to be advanced. Furthermore, when the tripping action occurs and the ratcheting movement goes into operation, the cam 177 advances toward the latch 170 in exact synchronism with the advance of the workpiece toward its final predetermined position. As the workpiece approaches its final position, the cam 177 engages the latch 170 and forces it out of engagement with the trip arm 157, thereby permitting the spring 172 to move the trip arm down and engage the follower 158 with the cam groove 159 in the clutch 155. After the trip arm engages the cam groove, the crank shaft 137 continues to revolve as the crank 136 moves through the dead center position shown in Fig. 9 in the final ratcheting movement which precisely positions the workpiece. As the crank then approaches the other dead center position shown in Fig. 7, the cam follower 158 engages a part of the cam groove 159 which operates to force the clutch 155 out of engagement with the teeth of the driving wheel 153 and causes the mechanism to stop with the pawl 133 in engagement with the abutment 150 and out of contact with the ratchet wheel 132. As an aid in setting up the trip mechanism, the position of the gear 176, at the instant at which the cam 177 engages the latch 170, may be ascertained from the exterior of the machine by means of an indicator rod 180 projecting from the front of the knee, as shown in Fig. 5, upon being engaged by a contact point 181 on the gear 176 at the time that the cam releases the latch.

For downward movement of the knee or outward movement of the saddle, the reversing clutch gear 61 is engaged with the driving clutch gear 54 at the outer end of the shaft 55. Conversely, the clutch gear 61 is engaged with the inner drive clutch 60 for upward movement of the knee or inward movement of the saddle to advance the workpiece 26 toward the cutter 27. When moving a workpiece toward the cutter 27 either vertically or horizontally, with the reversing clutch gear 61 engaged with the clutch gear 60, as the workpiece approaches the cutter the feed may be disconnected by moving the clutch gear 61 to the central disengaged position, shown in Fig. 5. This occurs automatically through operation of the trip mechanism just prior to engagement of the auxiliary positioning drive mechanism, the pawl 133 then continuing movement of the ratchet wheel 132 in the same direction, but at much lower speed.

If under these circumstances, the reversing clutch gear 61 is engaged inadvertently with the other driving clutch gear 54, the ratchet wheel 132 would be driven in the opposite direction at high speed with the result that the mechanism would be damaged. To prevent this occurrence, the clutch gear 54 is arranged to be retracted toward the front of the knee out of range of the sliding gear 61, during the time that the auxiliary drive is engaged. For this purpose, there is provided an interlocking shifter fork 185 as shown in Fig. 10, one end of which engages a groove in the hub of the gear 54, the fork being pivoted on a pin 186. The other end of the fork 185 engages the end face of a cam 187 fixed on the crank shaft 137, the arrangement being such that when the clutch 155 is engaged and the cam 187 is turned, the lower end of the fork 185 is moved to the left, as shown in Fig. 10, and its upper end is moved to the right or outwardly to retract the gear 54. When the lower end of the fork 185 moves to the left, it is engaged by a latch 188 which operates to hold the fork 185 and the gear 54 in retracted position as long as the clutch 155 remains in engagement. When the clutch 155 is disengaged at the end of a positioning movement by action of the cam groove 159 in cooperating with the follower 158, a flange 190 on the clutch engages a roller 191 on the latch 188 as it moves to the right, thereby pivoting the latch about a supporting pin 192 and disengaging it from the interlocking fork 185. This permits the gear 54 to return to the normal position, under influence of a coil spring 194 disposed around the shaft 55, whereupon the feed mechanism may be engaged for moving the knee downwardly or the saddle outwardly.

Since it is not desired to engage the positioning drive while the knee is moving down or the saddle is moving out, the arm 164 of the trigger bell crank 162 is provided with a spring biased latch 195. The latch is so arranged that it will be engaged by the depending end of a cooperating pin 196 in the end of the shifting fork 81 which engages the tripping member 83 when a tripping action occurs in the course of upward or inward movement for actuating the bell crank 162, but will be deflected by the pin 196 when the tripping member 83 is moved in the course of downward or outward movement of the workpiece.

If it is desired to disengage the positioning mechanism so that it will not function in response to an upward or inward tripping action, the bell crank 162 may be moved downward along the pivot pin 163 to lower the arm 164 thereof and the latch 195 out of range of the lower end of the pin 196 on the shifting fork 81, in order that movement of the shifting fork 81 will not result in turning the bell crank 162 and lifting the follower 158 out of the clutch groove 159. This is accomplished by turning a selector lever 200 on the left side of the knee 23 and which is carried on the outer end of a shaft 201. At its inner end, the shaft 201 carries an eccentric pin 202, that engages a slot 203 in the bell crank 162, the arrangement being such that when the shaft 201 is turned by actuating the lever 200, the eccentric pin 202 causes the bell crank 162 to slide up or down along the pin 163. A detent mechanism, including a spring pressed ball 204, is provided in the shaft for holding it in either the engaged or the disengaged position.

From the foregoing detailed description of a milling machine constituting a practical illustrative embodiment of the present invention, it will be apparent to those skilled in the art, that there has been provided a new and improved mechanism for effecting precision positioning of a machine tool element automatically.

Although the illustrated embodiment of the invention has been described in considerable detail for the purpose of making a full disclosure of an operative structure whereby the invention may be practiced commercially, it is to be understood that the various novel features herein disclosed may be incorporated with advantage in other structural forms without departing from the spirit and scope of the invention, as defined in the subjoined claims.

The principles of the invention having now been fully explained in connection with the foregoing description of the embodying apparatus, I hereby claim as my invention:

1. In a machine tool having a base and a carriage movably mounted on said base, propelling mechanism operatively arranged to move said carriage on said base, power driven feed mechanism selectively connectible to said propelling mechanism for driving said carriage at feed rate, trip mechanism operative by movement of said carriage as it approaches a predetermined position to disconnect said feed mechanism from said propelling mechanism, a ratchet adjustably connected to said propelling mechanism, a pawl disposed to engage and actuate said ratchet, power driven apparatus selectively operable to move said pawl for actuating said ratchet, control mechanism operated by said trip mechanism incident to disconnecting said feed mechanism and serving to initiate operation of said ratchet actuating pawl, and tripping means actuated by said ratchet and operative when said carriage arrives at said predetermined position to discontinue operation of said pawl actuating means following a final ratcheting movement that positions said carriage precisely at the said predetermined position, said position being selectively predetermined by adjustment of said ratchet relative to said propelling mechanism.

2. In a machine tool having a frame carrying a movable supporting element, means for positioning said element relative to said frame, comprising power driven feeding mechanism selectively connectible to advance said element along said frame, trip mechanism arranged to disconnect said feeding mechanism upon said element approaching to within a predetermined distance from a predetermined position relative to said frame, a ratchet arranged to effect a further advance of said element toward said predetermined position, a crank mechanism disposed to act upon said ratchet to actuate it intermittently, means responsive to operation of said trip mechanism in disconnecting said feeding mechanism and operative to effect actuation of said crank mechanism, and tripping means responsive to the arrival of said element at a position closely adjacent to said predetermined position and operative to effect stopping of said crank mechanism following a final stroke through dead center position, whereby during said final stroke said element approaches said predetermined position with a smoothly decelerating action and stops precisely at said position as said crank passes its dead center position.

3. In a machine tool having a frame and a supporting element movably mounted on said frame, means for precisely positioning said element relative to said frame, comprising a driving mechanism arranged to move said element relative to said frame, a ratchet wheel adjustably coupled to said driving mechanism, a pawl disposed to cooperate with said ratchet wheel, a crank mechanism operatively connected to actuate said pawl, timing gearing connected to be driven by said ratchet wheel, and tripping means actuated by said timing gearing and operative to discontinue operation of said crank mechanism following a predetermined movement thereof through dead center position, whereby said supporting element may be moved with smoothly decelerating action to and stopped precisely at a position relative to said frame predetermined by adjustment of said ratchet wheel relative to said element driving mechanism.

4. In a machine tool having a frame and a supporting element movably mounted on said frame, together with driving mechanism for moving said element relative to said frame, apparatus for effecting precise positioning of said movable element comprising a ratchet adjustably connected to said driving mechanism, a pawl disposed to engage said ratchet for actuating it, a crank mechanism operatively connected to oscillate said pawl with simple harmonic motion, a power train selectively connectible to said crank mechanism to actuate said apparatus, and tripping mechanism operated by said crank mechanism and functioning to disconnect said power train after said crank has passed dead center position, whereby said supporting element may be moved with a smoothly decelerating action to and stopped precisely at a position predetermined by the adjustment of said ratchet relative to said driving mechanism.

5. In a machine tool including a frame and a supporting element movably mounted on said frame, actuating mechanism arranged to effect movement of said supporting element relative to said frame, a ratchet wheel adjustably connected to drive said actuating mechanism, a pawl disposed to engage and turn said ratchet wheel, a crank mechanism operatively connected to actuate said pawl with simple harmonic motion, power actuated means selectively connectible to drive said crank mechanism, and a tripping mechanism driven by said ratchet wheel and operative to disconnect said crank driving power means upon the completion of a final ratcheting movement, the position at which said supporting element stops at the completion of the ratcheting movement being determined by the adjustment of said ratchet wheel relative to said actuating mechanism.

6. In apparatus for precisely positioning a movable member of a machine tool, power operated means selectively connected to move said member to be positioned, a ratchet adjustably connected to said member, a pawl disposed to engage and actuate said ratchet, crank mechanism operatively connected to oscillate said pawl with simple harmonic motion, tripping mechanism operative in response to the arrival of said member at a position within an approximately predetermined distance from a precisely predetermined position and functioning to disconnect said power operated means and to effect operation of said crank mechanism to move said member to said predetermined position, and tripping mechanism operative in response to movement of said crank past its dead center position and functioning to stop said crank, whereby said movable member may be given a final smoothly decelerating movement to said precisely predetermined position.

7. In a machine tool, a frame, a supporting member movably mounted on said frame, an actuating device operatively connected to move said supporting member, power feeding means selectively connectible to drive said actuating device, a trip mechanism operative in response to movement of said member in approaching a predetermined position and functioning to disconnect said power feeding means from said actuating device, a positioning mechanism including a clutch responsive to operation of said trip mechanism in disconnecting said feeding means and adapted to be engaged for effecting a final positioning movement, a crank driven by said clutch, a connecting rod operatively arranged to be actuated by said crank, a pawl connected to be reciprocated by said connecting rod, a ratchet disposed to be engaged and advanced by said pawl, means adjustably connecting said ratchet to said actuating device, and trip mechanism operative in response to movement of said ratchet and functioning to disengage said clutch after said supporting member has been moved by said ratchet precisely to the predetermined position with a final smoothly decelerating movement as said crank approaches and moves through dead center position, said final position being predetermined precisely through adjustment of the connection between said ratchet and said actuating device.

8. In a machine tool, a frame, a supporting structure movably mounted on said frame, actuating mechanism operatively connected to move said structure relative to said frame, power driving means including reversing and disconnecting gearing connected to drive said actuating mechanism, trip mechanism operative upon the approach of said structure to a predetermined position and functioning to shift said gearing to disconnecting position, auxiliary positioning means arranged to become operative to drive said actuating mechanism upon functioning of said trip mechanism in disconnecting said gearing and serving to precisely position said structure, and interlocking mechanism arranged to prevent reversing action of said gearing while said auxiliary positioning drive is operative upon said actuating mechanism.

9. In a machine tool, a frame, a carriage movably mounted on said frame, a driving mechanism operatively connected to actuate said carriage, reversing and disconnecting gearing selectively engageable to actuate said driving mechanism, trip mechanism operative in response to movement of said carriage to within an approximately predetermined distance from a precisely predetermined position and effective to disengage said reversing gearing, an auxiliary drive arranged to be engaged by operation of said trip mechanism in disengaging said reversing gearing and effective to move said carriage precisely to said predetermined position, and an interlocking mechanism operative while said auxiliary drive is engaged to prevent reverse engagement of said reversing gearing.

10. In a precise positioning apparatus for a machine tool movable member, a ratchet adjustably connected to the member to be positioned, a pawl disposed to engage and actuate said ratchet, a crank operatively connected to oscillate said pawl, tripping mechanism operative in response to movement of said member in approaching a predetermined position and functioning to stop said member and effect operation of said crank, and tripping mechanism operative in response to movement of said crank after it has passed its dead center position and functioning to stop said crank, whereby said movable member may be given a final smoothly decelerating movement to a precisely predetermined position.

11. In a machine tool, a frame, a carriage movably mounted on said frame, driving mechanism operatively connected to actuate said carriage, power driving means including reversing and disconnecting gearing selectively engageable to actuate said driving mechanism in either direction, trip mechanism operative in response to movement of said carriage to within an approximately predetermined distance from a precisely predetermined position and effective thereupon to disengage said disconnecting gearing, an auxiliary drive arranged to be engaged by operation of said trip mechanism in disengaging said gearing and effective thereupon to move said carriage precisely to said predetermined position, and an interlocking mechanism operative upon said gearing to render said reversing gearing inoperative when said auxiliary drive is engaged thereby to prevent reverse engagement of said reversing gearing during engagement of said auxiliary drive.

12. In a machine tool having a base and a carriage movably mounted on said base, propelling mechanism operatively arranged to move said carriage on said base, power driven mechanism selectively connectible to actuate said propelling mechanism for driving said carriage, trip mechanism operative by movement of said carriage as it approaches a predetermined position and functioning thereupon to disconnect said power driven mechanism from said propelling mechanism, a ratchet adjustably connected to move said carriage on said base, a pawl disposed to engage and actuate said ratchet, power driven apparatus selectively operable to move said pawl for actuating said ratchet, control mechanism operated by said trip mechanism as an incident to disconnecting said power driven mechanism and serving to initiate operation of said ratchet actuating pawl, and tripping means actuated by movement of said ratchet and operative when said carriage arrives at said predetermined position to discontinue operation of said pawl moving means following a final ratcheting movement thereof that positions said carriage precisely at the said predetermined position, said position being selectively predetermined by adjustment of said ratchet.

13. In a machine tool having a frame carrying a movable supporting element, means for positioning said element relative to said frame, said means comprising power driven mechanism selectively connectible to advance said element along said frame, trip mechanism arranged to disconnect said power driven mechanism upon said element approaching to within a predetermined distance from a predetermined position relative to said frame, a ratchet arranged to effect a further advance of said element toward said predetermined position, a crank mechanism disposed to act upon said ratchet to actuate it by a series of intermittent strokes upon the crank turning through dead center position, means responsive to operation of said trip mechanism in disconnecting said power driven mechanism and operative to effect actuation of said crank mechanism, and tripping means responsive to the arrival of said element at a position within one stroke of said crank mechanism from said predetermined position and operating with delayed action to effect stopping of said crank mechanism following a final stroke through dead center position, whereby during said final stroke said element approaches said predetermined position with a smoothly decelerating action and stops precisely at said position as said crank passes its dead center position.

14. In a machine tool having a movable member, propelling mechanism operatively arranged to effect movement of said member, a source of power for actuating said propelling mechanism, traversing gearing selectively engageable to connect said source of power to said propelling mechanism to actuate it in moving said machine member, a ratchet mechanism selectively engageable to connect said source of power to said propelling mechanism to effect step by step ratcheting movement of said movable member for precisely positioning it at a predetermined position upon the completion of a final ratcheting step, a rotatable tripping cam operating in synchronism with movement of said movable member and serving to disengage said ratchet mechanism following the final position ratcheting step thereof, and trip mechanism responsive to movement of said machine member in approaching said predetermined position and operative to disengage said traversing gearing and engage said ratchet mechanism after said tripping cam has passed its next to the last tripping position but before it has reached its last tripping position, whereupon said ratchet mechanism will continue the movement of said member through as many ratcheting steps as are necessary to advance it to and stop it precisely at said predetermined position.

15. In a machine tool, a frame, a supporting member movably mounted on said frame, an actuating device operatively connected to move said supporting member in approaching a predetermined position, a positioning mechanism including a clutch adapted to be engaged to drive said actuating device for effecting a final positioning movement of said member, a crank driven by said clutch, a connecting rod operatively arranged to be actuated by said crank in turning through dead center position, a pawl connected to be reciprocated by said connecting rod, a ratchet disposed to be engaged and advanced by said pawl, means adjustably connecting said ratchet to said actuating device, and trip mechanism operative in response to a final movement of said ratchet and functioning with delayed action to disengage said clutch after said supporting member has been moved by said ratchet precisely to the predetermined position with a final smoothly decelerating movement as said crank approaches and moves through its final dead center position, said final position being predetermined precisely through adjustment of said connecting means between said ratchet and said actuating device.

JOSEPH B. ARMITAGE.

REFERENCES CITED

The following references are of record in the file of this patent:

UNITED STATES PATENTS

| Number | Name | Date |
|---|---|---|
| 1,442,537 | Orcutt | Jan. 16, 1923 |
| 1,715,604 | Kearney et al. | June 4, 1929 |
| 1,846,956 | Einstein et al. | Feb. 23, 1932 |
| 2,060,044 | Crowey | Nov. 10, 1936 |
| 2,164,875 | Herfurth | July 4, 1939 |
| 2,200,544 | Drummond | May 14, 1940 |
| 2,398,346 | Anderson | Apr. 16, 1946 |